US010292073B2

(12) United States Patent
Bedekar (10) Patent No.: US 10,292,073 B2
(45) Date of Patent: May 14, 2019

(54) ENHANCEMENT FOR X2/XN TO SUPPORT RAN SLICING (71) Applicant: Nokia Solutions and Networks Oy, Espoo (FI)

(72) Inventor: Anand Bedekar, Glenview, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/620,951

(22) Filed: Jun. 13, 2017

(65) Prior Publication Data
US 2018/0359661 A1 Dec. 13, 2018

(51) Int. Cl.
H04W 36/00 (2009.01)
H04W 92/20 (2009.01)
H04W 36/32 (2009.01)
H04W 84/04 (2009.01)

(52) U.S. Cl.
CPC ........ H04W 36/0011 (2013.01); H04W 36/32 (2013.01); H04W 92/20 (2013.01); H04W 36/0061 (2013.01); H04W 84/042 (2013.01)

(58) Field of Classification Search
CPC . H04W 36/0011; H04W 36/32; H04W 92/20; H04W 36/0061; H04W 84/042
See application file for complete search history.

(56) References Cited

U.S. PATENT DOCUMENTS

| 2013/0303114 | A1* | 11/2013 | Ahmad | H04W 16/14 455/406 |
| 2014/0148165 | A1* | 5/2014 | Serravalle | H04W 16/14 455/436 |
| 2014/0370894 | A1 | 12/2014 | Hosdurg | 455/436 |
| 2015/0358399 | A1* | 12/2015 | Baugher | H04L 67/1002 709/203 |
| 2016/0014665 | A1* | 1/2016 | Centonza | H04W 28/08 455/436 |
| 2016/0212775 | A1* | 7/2016 | Xu | H04W 76/10 |
| 2017/0311278 | A1* | 10/2017 | Adjakple | H04W 60/00 |
| 2018/0077637 | A1* | 3/2018 | Basilier | H04W 48/18 |
| 2018/0124854 | A1* | 5/2018 | Myhre | H04W 4/70 |

FOREIGN PATENT DOCUMENTS

WO WO-2017171598 A1 * 10/2017 ........ H04W 36/0061

OTHER PUBLICATIONS

"3rd Generation Partnership Project; Technical Specifiction Group Services and System Aspects; Service requirements for the 5G system; Stage 1 (Release 15)", 3GPP TS 22.261 V15.0.0, Section 6.1 Network slicing, 6.1.1-6.1.2, Mar. 2017, 2 pgs.
"Selection RAN Part Network Slice during UE mobility", ZTE, 3GPP TSG RAN WG3 NR-adhoc, R1-170065, Jan. 2017, 7 pages.
Qian, Clara Li, et al., "An end-to-end network slicing framework for 5G wireless communication systems", ETSI Workshop on Future Radio Technologies—Air Interfaces, Jan. 2016, 4 pages.

* cited by examiner

Primary Examiner — Mehmood B. Khan
(74) Attorney, Agent, or Firm — Harrington & Smith (57) ABSTRACT In accordance with the example embodiments of the invention there a method and apparatus to perform at least establishing, by a network node of a communication network, one or more connections over one or more interfaces with another network node of the communication network, and based on the establishing, communicating over the one or more connections, information associated with multiple slices of the communication network.

16 Claims, 4 Drawing Sheets

ENHANCEMENT FOR X2/XN TO SUPPORT RAN SLICING

TECHNICAL FIELD

The teachings in accordance with the exemplary embodiments of this invention relate generally to improving network slicing procedures in a communication network and, more specifically, relate to enabling network slice specific procedures using an Xn information exchange in non-UE associated procedures.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CA Carrier Aggregation
CAC Composite Available Capacity
CIO Cell Individual Offset
DC dual connectivity
ID Identification
I/F Interface
eNB Evolved nodeB
EPC Evolved Packet Core
gNB Next generation NB (5G NB)
LTE Long Term Evolution
MME Mobility Management Entity (part of LTE EPC)
MPS Multimedia Priority Service
MVNO Mobile Virtual Network Operator
NCE Network Control Element
NR New Radio (5G RAT)
N/W Network
PDCP Packet Data Convergence Protocol (protocol layer)
QoS Quality of Service
RAN Radio Access Network
RAT Radio Access Technology
RSU Resource Status Update
SCTP Stream Control Transmission Protocol
UE User Equipment Next-generation 5G networks and future communication technology networks are designed to enable unsurpassed mobile and connected communications. Still, there has been much effort to improve latency, throughput, capacity, and availability of these communication technologies. In the advancement of these communication technologies there is seen to be a shift from the current network of entities architecture to a network of capabilities architecture. Network slicing offers one effective way to meet the requirements of all use cases using a common network infrastructure.

The example embodiments of the invention as disclosed herein work to improve network slicing procedures and operations in communication networks.

SUMMARY

In an example aspect of the invention, there is a method, comprising: establishing, by a network node of a communication network, one or more connections over one or more interfaces with another network node of the communication network, and based on the establishing, communicating over the one or more connections, information associated with multiple slices of the communication network.

In another exemplary aspect of the invention, there is a non-transitory computer-readable medium storing program code, the program code executed by at least one processor to perform establishing, by a network node of a communication network, one or more connections over one or more interfaces with another network node of the communication network, and based on the establishing, communicating over the one or more connections, information associated with multiple slices of the communication network.

In still another exemplary aspect of the invention, there is an apparatus comprising at least one processor; and at least one memory including computer program code, where the at least one memory and the computer program code are configured, with the at least one processor, to cause the apparatus to at least: establish, with a network node of a communication network, one or more connections over one or more interfaces with another network node of the communication network, and based on the establishing, communicate over the one or more connections, information associated with multiple slices of the communication network.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, there is proposed at least method and apparatus for improving network slicing procedures in a communication network.

In LTE X2, certain non-UE-associated signaling procedures are used to transfer information (typically related to certain cells) between neighbor eNBs.

A purpose of the X2 Setup procedure is to exchange application level configuration data needed for two eNBs to interoperate correctly over the X2 interface. This procedure can be configured to erase any existing application level configuration data in the two nodes and replaces it by the one received. This procedure can also reset the X2 interface. In 5G, an Xn interface between gNBs is a counterpart of X2.

Following the establishment of an X2 connection, the two eNBs can exchange various messages to convey various types of information or to execute certain procedures. Some procedures such as handover of a certain UE are termed "UE-associated", since they relate to a specific UE. Other procedures or messages over the X2 interface are termed "non-UE-associated", since the purpose of the procedure or the information exchanged does not relate to a specific UE but to cell or eNB as a whole. In 5G, an Xn interface between gNBs is a counterpart of X2. Examples of such non-UE-associated procedures include:

Mobility Change Request—to adjust mobility offset (typically Cell Individual Offset or CIO) synchronously at both eNBs to minimize ping-pongs;

Load Information (e.g. Benefit Metric);

Resource Status Reporting (e.g. providing Composite Available Capacity or CAC)—used for load-balancing decisions (including changing the mobility offset, etc)

The information provided in the non-UE-associated procedures represents the state of an entire cell, and the behaviors that can be executed using that information are correspondingly at cell-level.

Network slicing requirements are included in 3GPP 22.261. Network slicing allows the operator to provide customized networks. For example, there can be different requirements on functionality (e.g., priority, charging, policy control, security, and mobility), differences in performance requirements (e.g., latency, mobility, availability, reliability and data rates), or they can serve only specific users (e.g., MPS users, Public Safety users, corporate customers, roamers, or hosting an MVNO). A network slice can provide the functionality of a complete network, including radio access network functions and core network functions (e.g., potentially from different vendors). One network can support one or several network slices.

In 5G, with RAN slicing, UEs (or flows) can be mapped to slices, and different behaviors are desired for different RAN slices:

E.g., RAN slice created for "tenant with special mobility robustness needs" may desire that mobility offsets (e.g. CIO) be adjusted differently for this tenant's UEs than for other UEs:

E.g. to ensure that handover failure rates are <1% for this tenant's users, while for "generic" users the target handover failure rate may be different like 2%;

E.g. to change the handover offset towards certain neighbor cells (e.g. in the direction of a particular road/highway) to trigger HOs earlier for that tenant's users moving towards those neighbor cells, so as to make "too-late" HOs for that tenant's UEs lower than a desired threshold;

E.g., RAN slice created for a certain category of users (either belonging to a certain tenant, or conducting a certain service) may desire that load information or CAC reflects a different criterion that is suitable for that slice, than for more general users:

E.g. to execute load-balancing decisions differently for users belonging to a certain RAN slice;

E.g., A RAN slice may have a specific set of radio resources that are preferred for it, and it may be desired that actions like load-balancing for UEs mapped to that slice be based on the load and resource availability of the resources mapped to that slice.

However, currently there is no known way of enabling such slice-specific behaviors using information exchange in non-UE-associated procedures over X2 (or Xn in 5G)

The example embodiments of the invention work to at least enable network slice specific procedures using an Xn information exchange in non-UE associated procedures.

Figure 1:
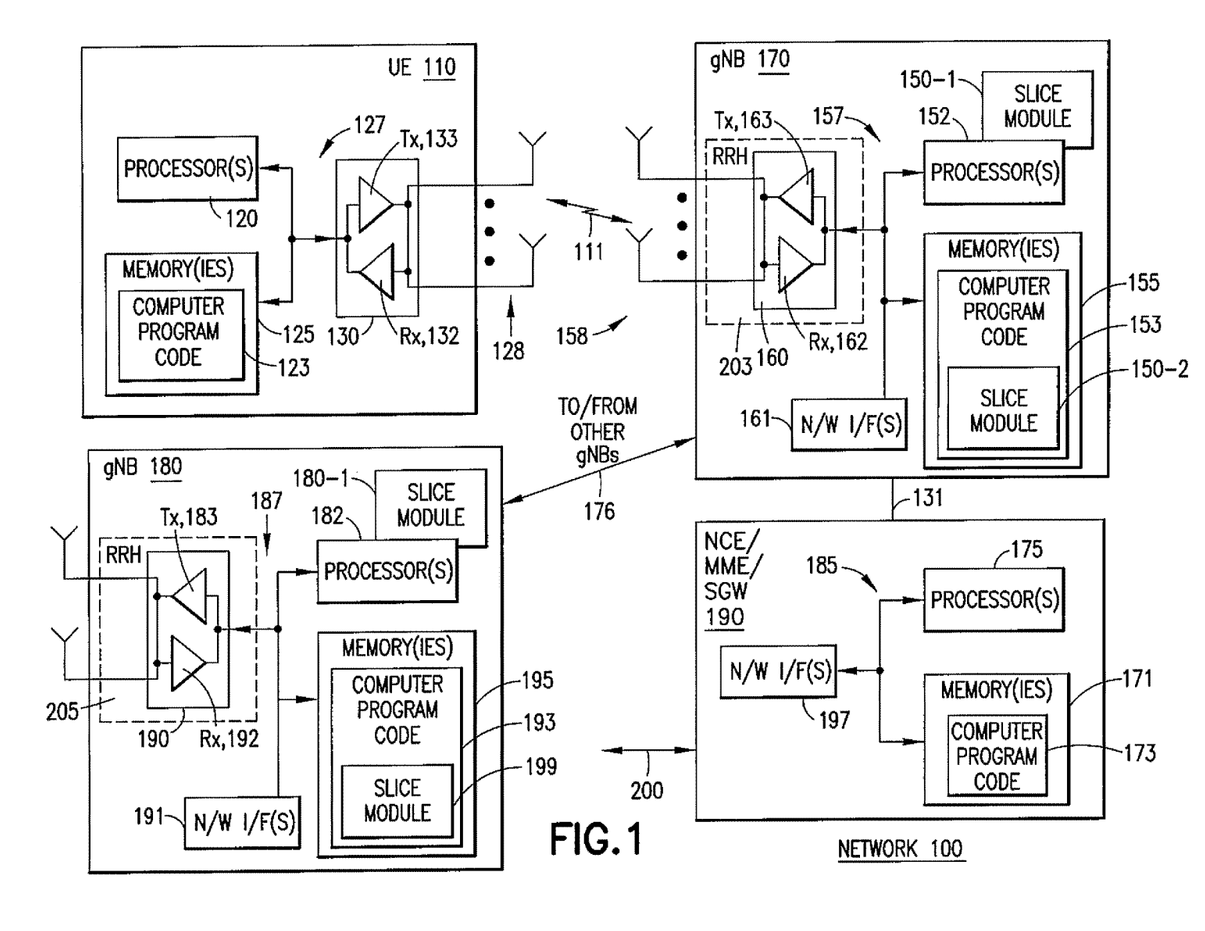
FIG. 1 shows a block diagram of one possible and non-limiting exemplary system in which the example embodiments of the invention may be practiced.

Before describing the example embodiments of the invention in detail, reference is made to FIG. 1 for illustrating a simplified block diagram of various electronic devices that are suitable for use in practicing the example embodiments of this invention.

FIG. 1 shows a block diagram of one possible and non-limiting exemplary system in which the example embodiments of the invention may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 communicates with gNB 170 and/or gNB 180 via a wireless link 111 and/or the one or more antennas 128.

The gNB 170 (NR/5G Node B or possibly an evolved NB) is abase station such as a secondary node base station (e.g., for NR or LTE long term evolution) that communicates with devices such as gNB 180 and UE 110 of FIG. 1. The gNB 170 provides access to wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. In accordance with the example embodiments these network interfaces 161 can include X2 and/or Xn interfaces for use to perform the example embodiments of the invention. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a Slice Module 150 which is configured to perform example embodiments of the invention as described herein. The Slice Module 150 comprising one of or both parts 150-1 and/or 150-2, which may be implemented in a number of ways. The Slice Module 150 may be implemented in hardware as Slice Module 150-1, such as being implemented as part of the one or more processors 152. The Slice Module 150-1 may be implemented also as an integrated circuit or through other hardware such as a programmable gate array. In another example, the Slice Module 150 may be implemented as Slice Module 150-2, which is implemented as computer program code 153 and is executed by the one or more processors 152. For instance, the one or more memories 155 and the computer program code 153 are configured to cause, with the one or more processors 152, the gNB 170 to perform one or more of the operations as described herein. The one or more network interfaces 161 communicate over a network such as via the links 176 and 111. Two or more gNB 170 may communicate with another gNB or eNB using, e.g., link 176.

Further, the link 176 may be wired or wireless or both and may implement, e.g., an X2 or Xn interface. Further the link 176 may be through other network devices such as, but not limited to an NCE/MME/SGW device such as the NCE/MME/SGW 190 of FIG. 1.

The gNB 180 (NR/5G Node B or possibly an evolved NB) is abase station such as a master node base station (e.g., for NR or LTE long term evolution) that communicates with devices such as the gNB 170 and/or UE 110 and/or the wireless network 100. The gNB 180 includes one or more processors 182, one or more memories 195, one or more network interfaces (N/W I/F(s)) 191, and one or more transceivers 190 interconnected through one or more buses 187. In accordance with the example embodiments these network interfaces 191 can include X2 and/or Xn interfaces for use to perform the example embodiments of the invention. Each of the one or more transceivers 190 includes a receiver Rx 192 and a transmitter Tx 183. The one or more transceivers 190 are connected to one or more antennas 185. The one or more memories 195 include computer program code 193. The gNB 180 also includes a Slice Module 199 which is configured to perform example embodiments of the invention as described herein. The Slice Module 199 may be implemented in hardware as Slice Module 180-1, such as being implemented as part of the one or more processors 182. The Slice Module 180-1 may be implemented also as an integrated circuit or through other hardware such as a programmable gate array. In another example, the Slice Module 180-1 may be implemented as Slice Module 199, which is implemented as computer program code 193 and is executed by the one or more processors 182. For instance, the one or more memories 155 and the computer program code 153 are configured to cause, with the one or more processors 182, the gNB 180 to perform one or more of the operations as described herein. The one or more network interfaces 181 communicate over a network such as via the link 176. Two or more gNB 170 or gNB 180 may communicate with another gNB and/or eNB or any other device using, e.g., link 176. The link 176 maybe wired or wireless or both and may implement, e.g., an X2 or Xn interface. Further, as stated above the link 176 may be through other network devices such as, but not limited to an NCE/MME/SGW device such as the NCE/MME/SGW 190 of FIG. 1.

The one or more buses 157 and 187 may be address, data, or control buses, and may include any interconnection mechanism, such as a series of lines on a motherboard or integrated circuit, fiber optics or other optical communication equipment, wireless channels, and the like. For example, the one or more transceivers 160 and/or 190 may be implemented as a remote radio head (RRH) 203 and/or 205, with the other elements of the gNB 170 being physically in a different location from the RRH, and the one or more buses 157 could be implemented in part as fiber optic cable to connect the other elements of the gNB 170 to a RRH.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The gNB 180 is coupled via a link 200 to the NCE 190. Further, the gNB 180 is coupled via link 176 to the gNB 170. The links 131, 176, and/or 200 may be implemented as, e.g., an S1 interface.

The NCE 190 includes one or more processors 175, one or more memories 171, and one or more network interfaces (N/W I/F(s)) 197, interconnected through one or more buses coupled with the link 185. In accordance with the example embodiments these network interfaces 197 can include X2 and/or Xn interfaces for use to perform the example embodiments of the invention. The one or more memories 171 include computer program code 173. The one or more memories 171 and the computer program code 173 are configured to, with the one or more processors 175, cause the NCE 190 to perform one or more operations which may be needed to support the operations in accordance with the example embodiments of the invention.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152, 182, or 175 and memories 155, 195, and 171, and also such virtualized entities create technical effects.

The computer readable memories 125, 155, 171, and 195 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 195 may be means for performing storage functions. The processors 125, 155, 171, and 195 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 182 may be means for performing functions, such as controlling the UE 110, gNB 170, gNB 180, to operate with the functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Options in accordance with the example embodiments of the invention that may be performed by an apparatus, such as the apparatus of FIG. 1, are described below.

Option 1: (can be a preferred option):
  Within a single X2(Xn) connection between eNBs (gNBs), in non-UE-associated signaling, the (scalar) information provided over X2/Xn for a given cell can be enhanced to instead provide a list (or vector) of Information elements, per slice ID. In addition, the associated slice ID(s) can also be provided for each item in the list:

E.g., in Mobility Change Request, instead of providing a single scalar value of Handover Trigger Change for a given cell, a gNB can provide a list of Handover Trigger Change values, along with associated Slice ID(s) to which each of the provided values in the list should apply; and/or E.g., in Resource Status Reporting, instead of providing a single scalar value of CAC for a given cell, a gNB can provide a list or vector of CAC values, along with associated Slice IDs to which each of the provided values in the list should apply.

A gNB, which receives the list or vector of information along with associated slice IDs in the Xn message, can use the appropriate values for each applicable slice:

Thus, for example, slice-specific load-balancing based on slice-specific CAC values can be executed; and/or Internally the gNB may provide the appropriate values for each slice to the slice-specific VNF or PNF that is in charge of managing a given slice;

Example: For a case that the value being conveyed is the Handover Trigger Change (in the Mobility Change Request message), different values may need to be conveyed for different slices. So the "list of Handover Trigger Change values, along with associated Slice ID(s) to which each of the provided values in the list should apply" can look like this:

HO trigger change value 1: say +0.5 dB: apply to slice IDs such as Slice 1A and/or Slice 1B; and/or HO trigger change value 2: say −0.5 dB: apply to the following slice IDs such as Slice 2A and/or Slice 2B; and/or For any given slice, there will be only one applicable value. The slice IDs (1A, 1B, . . . ) corresponding to HO trigger change value 1 would not overlap with the slice IDs (2A, 2B, . . . ).

Option 2: Currently X2 (and Xn in 5G) is defined as an interface between two eNBs (or two gNBs in 5G) with a single SCTP stream. Instead, the Xn structure can be enhanced to allow either:

Option 2(i): multiple SCTP streams within the Xn connection, each carrying information for some subset of RAN slices; and/or Option 2(ii): multiple Xn connections between the same pair of gNBs, each supporting information exchange for some subset of RAN slices.

Figure 2:
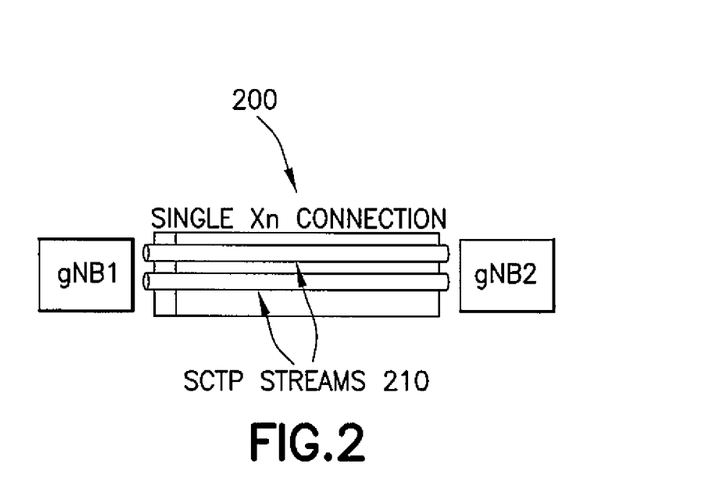
FIG. 2 shows an example message flow using a single Xn connection in accordance with the example embodiments of the invention.

FIG. 2 shows an example of Option 2(i) as stated above with a single Xn connection carrying information of more than one RAN slice between a gNB1 and a gNB 2, such as the gNB 170 and/or gNB 180 as in FIG. 1. In FIG. 2 there are two stream control transmission protocol (SCTP) streams 210 within a single Xn connection 200. In accordance with the example embodiments each stream will carry non-UE associated signaling information for particular subsets of slice IDs, for example the slice IDs 1A and 1B for a first stream of the streams 210 and slice IDs 2A and 2B for a second stream of the streams 210.

In accordance with an example embodiment of the invention 2 or more SCTP streams are established within single Xn connection. Each stream will carry non-UE-associated signaling information for some subset of slice IDs. For example, a Stream1: can slice carry information for slice IDs 1A, 1B etc.; and Stream 2 carries information for slice IDs: 2A, 2B, etc. In order to establish the additional SCTP streams and to decide which stream carries which Slice IDs, additional signalling is needed. In accordance with the example embodiments of the invention there is a message and operations flow with additional signalling as shown in FIG. 3.

Figure 3:
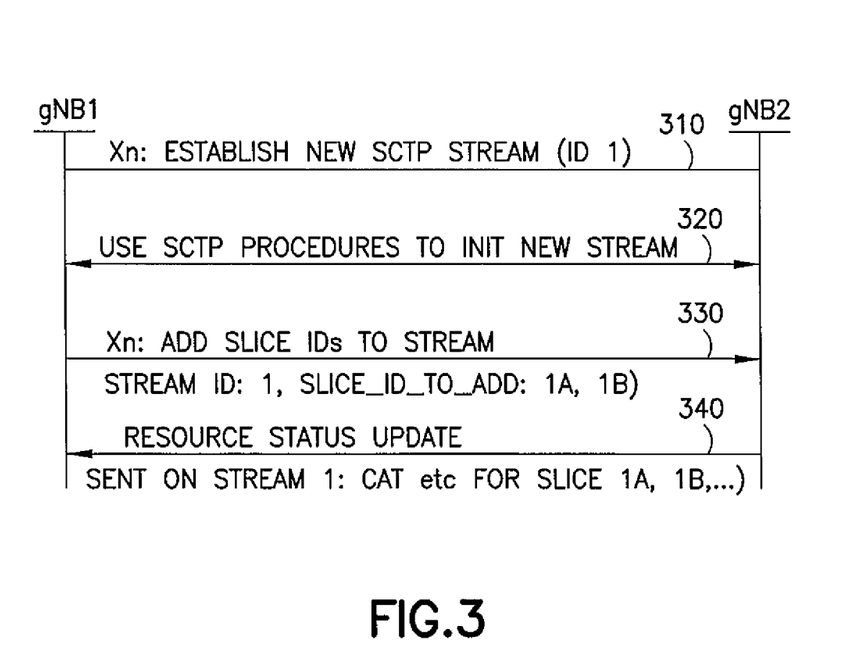
FIG. 3 shows a signaling diagram for a message flow using a single Xn connection in accordance with the example embodiments of the invention.

FIG. 3 shows a message flow of an option, such as for option 2(i) as stated above, in accordance with the example embodiments. As shown in FIG. 3 there is a communication flow over an Xn connection between the gNB1 and the gNB 2, such as between the gNB 170 and gNB 180 as in FIG. 1. As shown in step 310 of FIG. 3 a message over the Xn connection is to establish a new SCTP stream with an identification 1 (ID 1). As shown in step 320 there is a response to the message 310 which indicates to use SCTP procedures to initiate (i.e., init) the new stream. Then as shown in step 330 of FIG. 3 there is adding the slice ID (e.g., 1A and/or 1B) to the SCTP stream ID 1. Then as shown in step 340 of FIG. 3 there is performed a Resource Status Update. The update sent on the Stream ID 1 and a call admission control (CAC) is defined for slices 1A and 1B etc.

Figure 4:
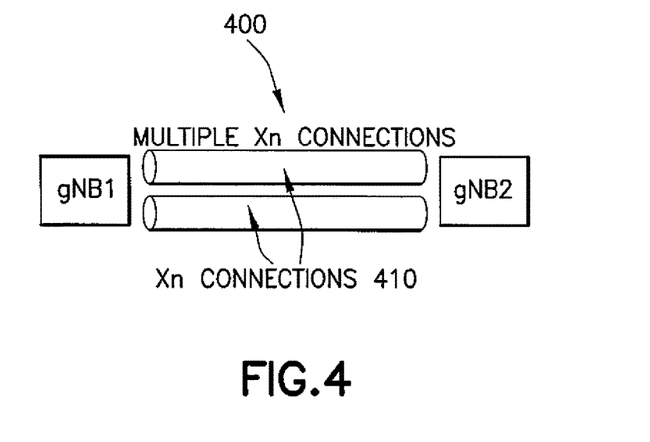
FIG. 4 shows an example message flow using multiple Xn connections in accordance with the example embodiments of the invention.

In FIG. 4 there is shown an example of an Option 2(ii) in which multiple Xn connections carrying information of more than one RAN slice between a gNB1 and a gNB 2, such as the gNB 170 and/or gNB 180 as in FIG. 1. In FIG. 4 there are shown multiple Xn connections 400. As shown in FIG. 4 the multiple connections 400 include two Xn connections 410 between the gNB1 and the gNB 2. Each Xn connection will carry non-UE associated signaling information for one or more subsets of slice IDs. For example, an Xn connection 1 may signal information for slice IDs 1A, 1B, etc., and Xn connection 2 may signal information for slice IDs 2A, 2B, etc.

Example message flow for Option 2(ii) in accordance with the example embodiments include Multiple Xn Setup Signaling needed to establish multiple Xn connections. On each Xn connection, a message "Add Slice Request" can be sent explicitly indicating which Slice IDs should be reported on that Xn connection. Subsequently, all normal Xn/X2 procedures like Resource Status request that are initiated on a particular Xn connection will report the relevant values (CAC etc) for all the Slice IDs that have been associated with that Xn connection.

Figure 5:
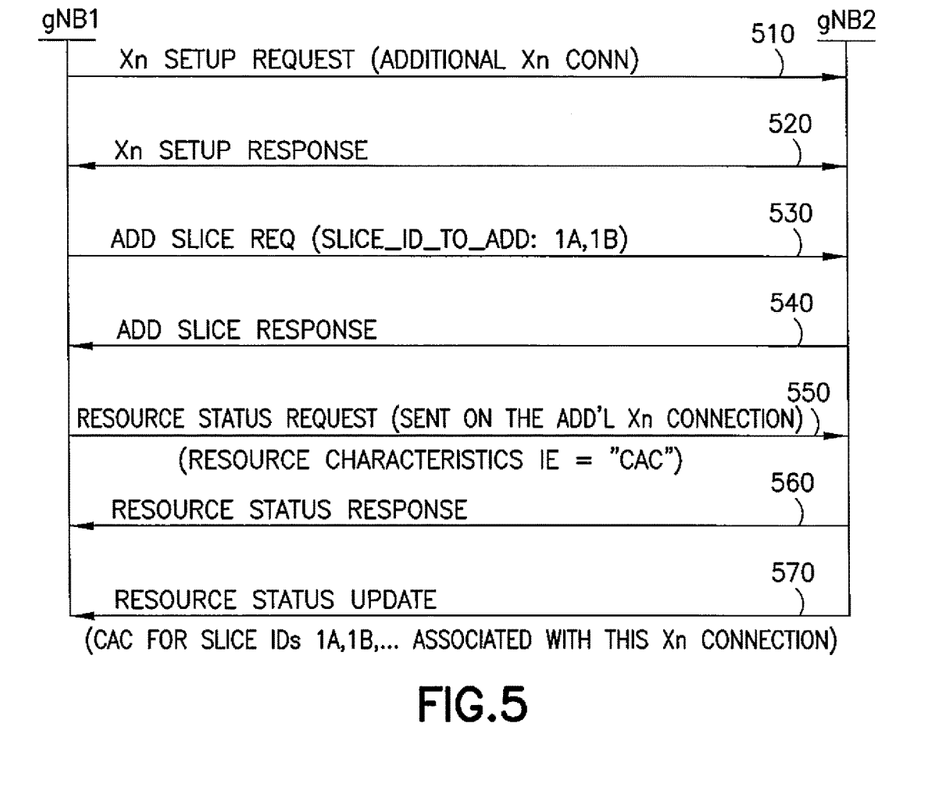
FIG. 5 shows a signaling diagram for a message flow using a multiple Xn connections in accordance with the example embodiments of the invention.

FIG. 5 shows a message flow of an option, such as for option 2(ii) as stated above, in accordance with the example embodiments. As shown in FIG. 5 the is a communication flow over more than one Xn connection between the gNB1 and the gNB 2, such as between the gNB 170 and gNB 180 as in FIG. 1. As shown in step 510 of FIG. 5 the gNB1 sends an Xn setup request (i.e., for an additional Xn connection) to the gNB2. At step 520 the gNB2 communicates an Xn setup response to the gNB 1. Then, at step 530 the gNB1 communicates an add slice request (Req). At step 540 the gNB2 communicates an add slice Response to the gNB1. At step 550 of FIG. 5 the gNB1 sends a resource status request on the added Xn connection. At step 560 the gNB2 responds with a Resource Status Response. Then at step 570 a Resource Status update if provided to the gNB1 by the gNB2. In accordance with the example embodiments of the invention this update can include a CAC for slice IDs associated with this added Xn connection (e.g., slice IDs 1A, 1B etc.).

Figure 6:
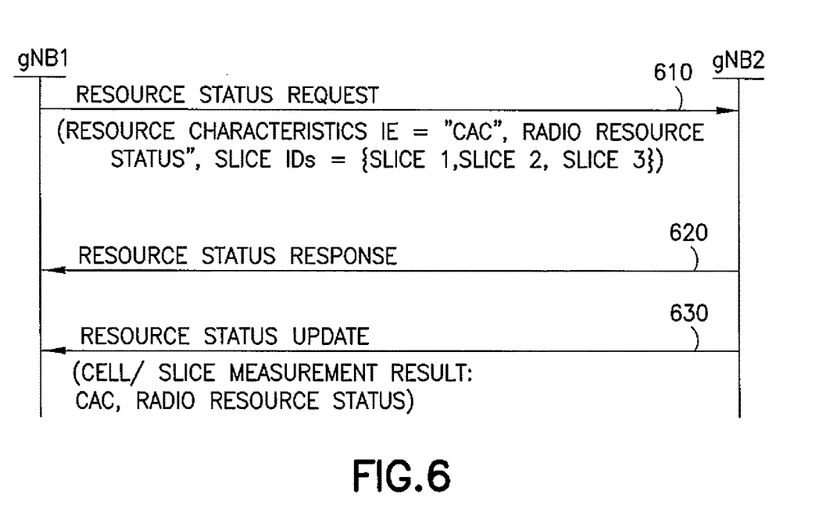
FIG. 6 shows a resource status reporting procedure in accordance with the example embodiments of the invention.

An example implementation/embodiment of the invention in a context of the Resource Status Reporting procedure is shown for example in FIG. 6:

At step 610 the gNB1 initiates Resource Status Request towards gNB2, and includes the requested measurements (Resource Characteristics IE)—CAC and Radio Resource Status in this example:

In addition to (or instead of) the "Cell to Report Item", gNB1 can request a "Slices to Report"—list of slice IDs for which the measurements are requested, since the measurements may be either for cells or for Slices;

The "measurement ID" for the request may also become a list of measurement IDs, per slice; and/or The Reporting Periodicity may also be slice-specific;

At step 620 the gNB2 responds with Resource Status Response, providing the measurements which it is able to provide; and Then at step 630 of FIG. 6, the gNB2 then starts providing Resource Status Update (RSU) messages at the requested periodicity:

The requested measurements (CAC, Radio Resource Status) are included in the RSU for the requested cell IDs or slice IDs; and E.g. instead of (or in addition to) Cell Measurement Result list, the gNB2 can include a "Slice Measurement Result" list, providing one or more Slice IDs and the associated measurements.

Figure 7:
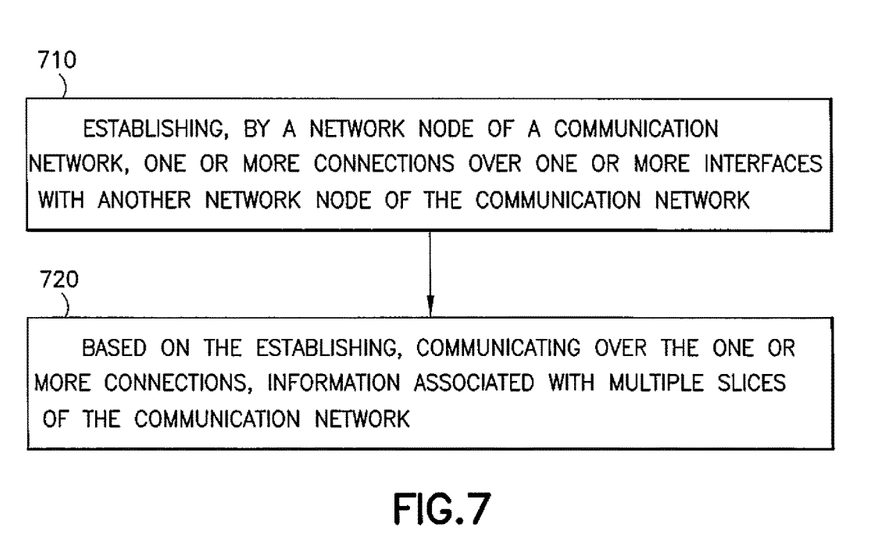
FIG. 7 shows a method performed by an apparatus in accordance with example embodiments of the invention.

FIG. 7 illustrates operations which may be performed by a network device such as, but not limited to, a gNB 170 and/or gNB 180 or an eNB as in FIG. 1. As shown in step 710 there is establishing, by a network node of a communication network, one or more connections over one or more interfaces with another network node of the communication network. Then as shown in step 720 there is, based on the establishing, communicating over the one or more connections, information associated with multiple slices of the communication network.

In accordance with the example embodiments as described in the paragraph above, the interface comprises at least one of an X2 and Xn interface.

In accordance with the example embodiments as described in the paragraphs above, the communicating comprises: within one interface, from the network node to the another network node, providing a list of Information Elements and indications of the slice identifiers to which each of the information elements corresponds.

In accordance with the example embodiments as described in the paragraphs above, the list of Information Elements and the indications of the corresponding slice identifiers is in the format of Information Element 1: slice 1A, slice 1B, . . . , Information Element 2: slice 2A, slice 2B . . . .

In accordance with the example embodiments as described in the paragraphs above, the list of Information Elements are included in at least one of Mobility Change Request, Resource Status Reporting, Handover Trigger Change, Add Slice Request, and Resource Characteristics Information Element message.

In accordance with the example embodiments as described in the paragraphs above, there are more than one interfaces, and wherein information corresponding to a different subset of slices is carried by each of the more than one interfaces.

In accordance with the example embodiments as described in the paragraphs above, there is sending a message requesting an addition of a Slice Identifier to a specific interface; or upon receiving a message requesting an addition of a Slice Identifier to a specific interface, providing information corresponding to the Slice Identifier over the specific interface.

In accordance with the example embodiments as described in the paragraphs above, there are more than one stream control transmission protocol connections with a single interface, and wherein information corresponding to a different subset of slices is carried by each of the more than one stream control transmission protocol connections.

In accordance with the example embodiments as described in the paragraphs above, the information associated with multiple slices comprises information elements for non-User Equipment-associated signaling procedures.

In accordance with the example embodiments as described in the paragraphs above, there is, based on the communicating, controlling operations of the communication network using the multiple slices with the one or more stream control transmission protocol connections.

A non-transitory computer-readable medium (Memory(ies) 155 and/or Memory(ies) 195 and/or Memory(ies) 171 of FIG. 1) storing program code (Computer Program Code 153 and/or Computer Program Code 193 of FIG. 1), the program code executed by at least one processor (Processors 152 and/or Processors 182 and/or Slice Modules 150-1 and 153 and/or Slice Modules 180-1 and 199) to perform the operations as at least described in the paragraphs above.

In accordance with an example embodiment of the invention as described above there is an apparatus comprising: means for establishing (Computer Program Code 153 and/or Computer Program Code 193; Processors 152 and/or Processors 182; and Slice Modules 150-1 and 153 and/or Slice Modules 180-1 and 199; and Memory(ies) 155 and/or Memory(ies) 195 and/or Memory(ies) 171 of FIG. 1), by a network node (gNB 170 and gNB 180 of FIG. 1) of a communication network (network 100 of FIG. 1), one or more connections over one or more interfaces with another network node of the communication network; and means, based on the establishing, for communicating (N/W I/F(s)) 161, 191, and/or 197; and/or links 111, 176, and/or 131) over the one or more connections, information associated with multiple slices of the communication network.

In the example aspect of the invention according to the paragraph above, wherein at least the means for establishing and communicating comprises a non-transitory computer readable medium (Memory(ies) 155 and/or Memory(ies) 195 and/or Memory(ies) 171 of FIG. 1) encoded with a computer program (Computer Program Code 153 and/or Computer Program Code 193 of FIG. 1) executable by at least one processor (Processors 152 and/or Processors 182; and Slice Modules 150-1 and 153 and/or Slice Modules 180-1 and 199 of FIG. 1).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof; mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
    establishing, by a network node of a communication network, one or more connections over one interface with another network node of the communication network;
    based on the establishing, communicating, by the network node, within the one interface from the network node to the another network node over the one or more connections, information associated with multiple slices of the communication network, wherein the one interface is associated with more than one stream control transmission protocol connections,
    wherein each slice of the multiple slices has a specific set of radio resources mapped to it and is configured to serve specific users and specific radio resources of the communication network,
    wherein the information comprises a list of Information Elements, vectors of each of the Information Elements of the list, and indications of slice identifiers each identifying at least one slice of the multiple slices that correspond to each Information Element of the list to at least enable communication operations to serve the specific users and the specific radio resources of the communication network using specific slices of the multiple slices of the communication network based on the configuration of the specific slices; and
    based on the communicating, controlling, by the network node, within the one interface the communication operations of the communication network using the multiple slices with the more than one stream control transmission protocol connections.

2. The method of claim 1, wherein the one interface comprises at least one of an X2 and Xn interface.

3. The method of claim 1, wherein the list of Information Elements and the indications of the corresponding slice identifiers is in a format of:
    Information Element 1: slice 1A, slice 1B, and
    Information Element 2: slice 2A, slice 2B, wherein the values 1A, 1B, 2A, and 2B are slice identifiers.

4. The method of claim 1, wherein the list of Information Elements are included in at least one of Mobility Change Request, Resource Status Reporting, Handover Trigger Change, Add Slice Request, and Resource Characteristics Information Element message.

5. The method of claim 1, wherein there are more than one interfaces, and wherein information corresponding to a different subset of slices is carried by each of the more than one interfaces.

6. The method of claim 5, further comprising: sending a message, requesting an addition of a Slice Identifier to a specific interface of the more than one interfaces; or upon receiving a message requesting an addition of a Slice Identifier to a specific interface of the more than one interfaces, providing information corresponding to the Slice Identifier over the specific interface.

7. The method of claim 1, wherein the information associated with the multiple slices comprises information elements for non-User Equipment-associated signaling procedures.

8. A non-transitory computer-readable medium storing program code, the program code executed by at least one processor to perform the method of claim 1.

9. An apparatus comprising:
    at least one processor; and
    at least one memory including computer program code, where the at least one memory and the computer program code are configured, with the at least one processor, to cause the apparatus to at least:
    establish, with a network node of a communication network, one or more connections over one interface with another network node of the communication network;
    based on the establishing, communicate within the one interface from the network node to the another network node over the one or more connections, information associated with multiple slices of the communication network, wherein the one interface is associated with more than one stream control transmission protocol connections,
    wherein each slice of the multiple slices has a specific set of radio resources mapped to it and is configured to serve specific users and specific radio resources of the communication network,
    wherein the information comprises a list of Information Elements, vectors of each of the Information Elements of the list, and indications of slice identifiers each identifying at least one slice of the multiple slices that correspond to each Information Element of the list to at least enable communication operations to serve the specific users and the specific radio resources of the communication network using specific slices of the multiple slices of the communication network based on the configuration of the specific slices, and based on the communicating, controlling, by the network node, within the one interface the communication operations of the communication network using the multiple slices with the more than one stream control transmission protocol connections.

10. The apparatus of claim 9, wherein the one interface comprises at least one of an X2 and Xn interface.

11. The apparatus of claim 9, wherein the list of Information Elements and the indications of the corresponding slice identifiers is in a format of:

Information Element 1: slice 1A, slice 1B, and

Information Element 2: slice 2A, slice 2B, wherein the values 1A, 1B, 2A, and 2B are slice identifiers.

12. The apparatus of claim 9, wherein the list of Information Elements are included in at least one of Mobility Change Request, Resource Status Reporting, Handover Trigger Change, Add Slice Request, and Resource Characteristics Information Element message.

13. The apparatus of claim 9, wherein there are more than one interfaces, and wherein information corresponding to a different subset of slices is carried by each of the more than one interfaces.

14. The apparatus of claim 13, wherein the at least one memory including the computer program code is configured with the at least one processor to cause the apparatus to: send a message requesting an addition of a Slice Identifier to a specific interface of the more than one interfaces; or upon receiving a message requesting an addition of a Slice Identifier to a specific interface of the more than one interfaces, provide information corresponding to the Slice Identifier over the specific interface.

15. The apparatus of claim 9, wherein the information associated with the multiple slices comprises information elements for non-User Equipment-associated signaling procedures.

16. The apparatus of claim 9, wherein the network node is embodied in a base station.

* * * * *